United States Patent Office 3,509,694
Patented May 5, 1970

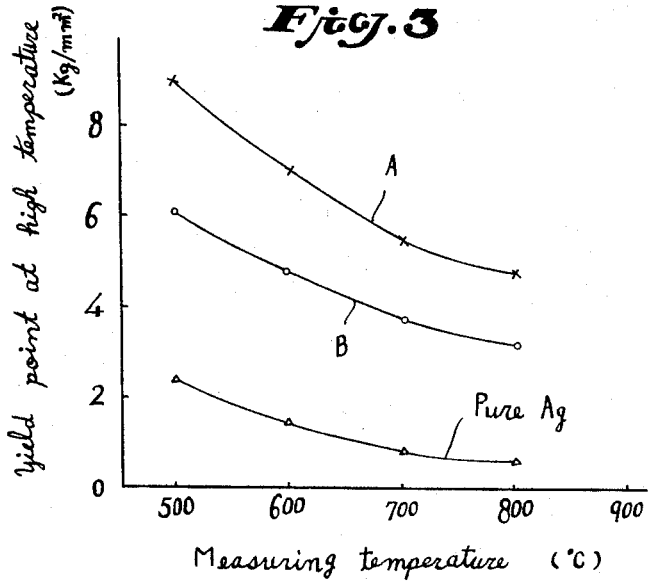
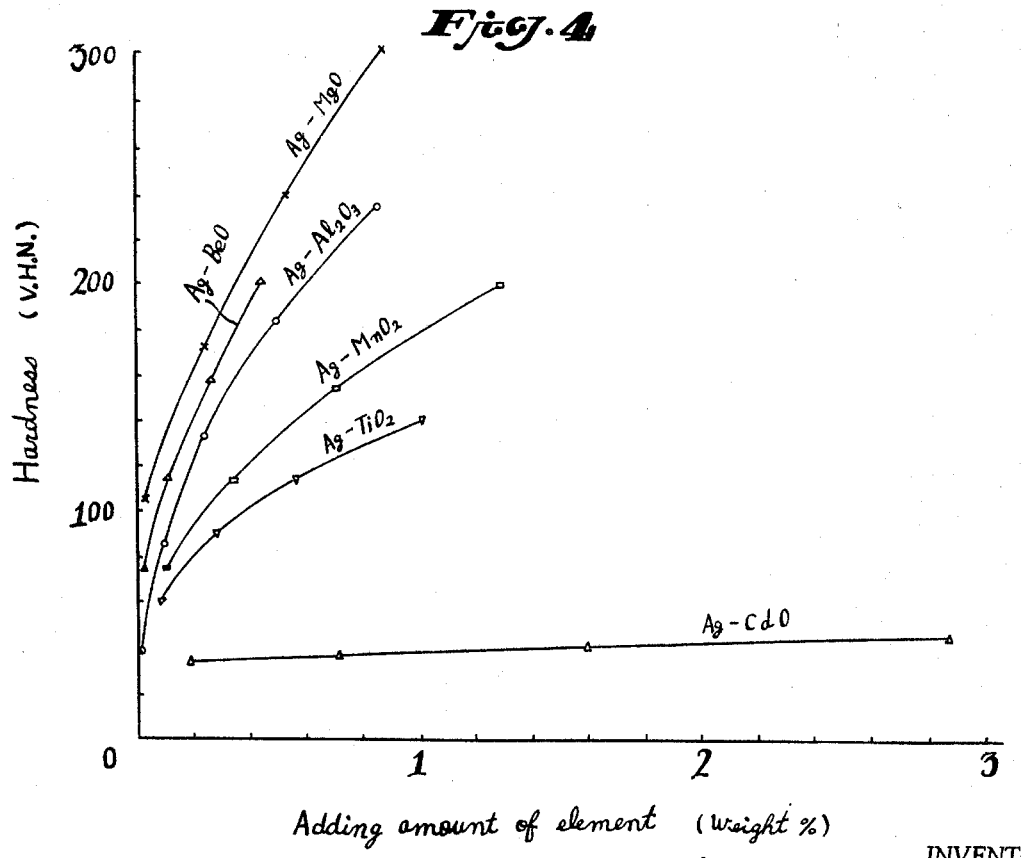

3,509,694
PROCESS AND APPARATUS FOR SELECTIVELY PERMEATING OXYGEN
Yunoshin Imai, 20 Gekicho-douri, Sendai-shi, Japan; Tamechika Yamamoto, 266 Shimotokorojima-Kamikawamae, Niigata-shi, Japan; and Yuzuru Isoya, 10-1 Magamachi-aza-Kashiji, Sendai-shi, Japan
Continuation-in-part of application Ser. No. 455,245, May 12, 1965. This application Apr. 1, 1968, Ser. No. 717,891
Claims priority, application Japan, May 16, 1964, 39/27,439
Int. Cl. B01d 59/10
U.S. Cl. 55—16                        4 Claims

ABSTRACT OF THE DISCLOSURE

A process and apparatus for selectively permeating oxygen with a dispersion type oxidized thin membrane having oxygen selective permeability characteristics approximating that of pure silver and having a high temperature yield point and comprising a mixture of at least one metal selected from the group consisting of aluminum, beryllium, cerium, cadmium, magnesium, manganese, silicon, thorium, titanium and zirconium, in the amount of approximately from 0.005% to 10% and the remainder being substantially silver.

---

The present invention is a continuation-in-part application of our co-pending patent application, Ser. No. 455,245, filed May 12, 1965 and now abandoned.

The present invention relates to dispersion type silver alloy metals, in general, and to a dispersion type silver metal membrane prepared by dispersing fine metallic oxides into crystal composition of silver, for use as a permeable wall through which oxygen can be selectively separated and purified by heating either the wall or an oxygen containing mixture gas, in particular.

Usually, pure silver formed as a thin plate-like film has a distinctive characteristic that selectively allows permeation of oxygen, and any other gaseous substances are not permeated.

It is also known that to permeate sufficient quantities for practical commercial applications, the membrane and/or the gaseous air containing oxygen must be heated to a temperature within the range of 800–900° C. Methods of measuring the permeation speed of the silver membrane, have been studied and disclosed by F. M. G. Johnson and P. Larose in the Journal of American Chemical Society, vol. 46, pp. 1377–1389, 1924 and by Leo Spencer in the Journal of Chemical Society, London, vol. 123, pp. 2124–2128, 1923, but these methods require strict conditions to be observed, such as, that one atmosphere partial pressure of raw oxygen; that the pressure of pure oxygen after permeation through the silver membrane must be maintained in vacuum, and that the maximum temperature for the silver membrane cannot exceed 650° C.

The aforesaid measurement of permeation rate has been always restricted due to the fact that the melting point of silver is 960.8° C. and that the measurement should be carried out at a temperature not exceeding 650° C. because of the rapid decrease in strength at such high temperatures.

Consequently, a membrane consisting of pure silver material could not be practically used for industrial uses.

The permeation speed of oxygen through a silver membrane is directly proportional to the temperature, the thinness of the membrane, the partial pressure of compressing the raw gas, and the decrease in the pressure of the pure oxygen permeating through the membrane. Accordingly, an oxygen permeable membrane having a greater yield point is necessary for an oxygen permeation device in which a thin membrane is employed having a high efficiency capable of operating under high temperatures.

It is an object of the present invention to provide a dispersion type silver alloy membrane capable of high speed permeability of oxygen which is particularly prepared by preventing crystal growth of silver at high temperatures so as to increase the high temperature tensile strength and the yield point as compared to pure silver material so that the permeant selectivity of the oxygen is not disturbed.

It is another object of the present invention to provide a dispersion type silver alloy membrane in accordance with the above-mentioned objective, employing silver alloy containing one or more elements, such as, aluminum, beryllium, cerium, cadmium, magnesium, manganese, silicon, thorium, titanium or zirconium prepared by melting, forming the alloy into a thin membrane, e.g., a thin plate (film) or a thin tube, and internally oxidizing the membrane, so that the dispersion type silver alloy membrane consists of metallic oxides of elements other than silver, which are homogeneously dispersed in the silver.

The elements and amounts added into silver applied by the present invention are listed in Table 1.

TABLE 1

| Element: | Amount, percent |
|---|---|
| Aluminum | 0.01–2.0 |
| Beryllium | 0.005–2.0 |
| Cerium | 0.01–10.0 |
| Cadmium | 0.1–10.0 |
| Magnesium | 0.005–2.0 |
| Manganese | 0.01–3.0 |
| Silicon | 0.01–2.0 |
| Thorium | 0.005–2.0 |
| Titanium | 0.01–2.0 |
| Zirconium | 0.005–2.0 |

Silver alloys containing aluminum in the amounts of 0.05%, 0.1%, 0.2%, 0.4% and 0.6% were respectively melted by high frequency currents in a vacuum, and these silver-aluminum alloys were respectively forged and rolled into membranes. The period for completing an internal oxidation process for these membranes in air at 600–800° C. was approximately 20 hours per 1 mm. thickness. The periods and the processing temperatures for oxidizing the other in silver alloy elements mentioned above were approximately the same as for aluminum. The aluminum dissolved into the silver was dispersed evenly forming into alumina ($Al_2O_3$), whereby a material having a uniform tensile strength at all portions thereof can be thus provided.

Further, the strength of the pure silver was also reinforced by the dispersing of fine grains of oxides such as, beryllium oxide, cerium oxide, cadmium oxide, magnesium oxide, manganese oxide, silicone oxide, thorium oxide, titanium oxide and zirconium oxide like alumina.

The yield point and the tensile strength at high temperatures of the membrane of the present invention containing silver will be illustrated by showing experimental examples which achieved the strengthening of the silver membrane by dispersing alumina and other oxidizing fine grains.

Usually, in the case of the pure silver, the yield point at normal temperatures is approximately 5 kg./mm.$^2$ but is decreased to 1–0.8 kg./mm.$^2$ when it is heated to 700–800° C.

However, in accordance with the present invention, the dispersion type silver alumina alloy membrane obtained from the silver-aluminum alloy provides a constant yield point.

Consequently, it has been found that aluminum is one of the most effective elements for combining with pure silver.

The reinforcing effect due to dispersion of alumina is only effective when the aluminum is in the range of 0.01–2.0%. However, addition of less than 0.01% aluminum may cause unsatisfactory effectiveness and addition of more than 2.0% aluminum may cause a brittleness of the product.

For this reason, a preferred amount of aluminum to be added into the pure silver is within the range of 0.01–2.0%.

In this connection, the respective upper and lower limit values of amounts of the other listed elements are also preferred to be within the range in Table 1.

The present invention provides a thin membrane commercially suited for selectively permeating oxygen therethrough for producing pure oxygen from a non-pure oxygen mixture, the membrane having high strength and good oxygen permeability at high temperatures. Heretofore, commercial production of oxygen by permeation has not been realized because a suitable oxygen-selective permeation membrane was required to be thin and yet withstand high temperatures and high pressures, and it was not known how to make such a membrane. The present invention now provides such a membrane for the first time, from a special alloy prepared by preventing the crystal growth of silver at high temperatures and which increases the high temperature tensile strength and the yield point, as compared with pure silver material, so that the permeability selectivity of oxygen is not disturbed and which permits the economical permeation of oxygen at high temperature and pressure conditions.

Economical and commercial permeation of oxygen specifically requires high temperatures, thin membranes, high partial pressures of compression of the raw gas, and a decrease in the pressures of the pure oxygen penetrating through the membrane. Heretofore, with pure silver, which has been used for oxygen permeation (although not for commercial production of oxygen), these conditions required for commercial production could not be achieved. However, the membrane of the present invention is able to withstand the necessary high temperatures with a thin membrane, and also to selectively permeate oxygen at a high rate, providing the advantages of an increase in the permeation volume of oxygen per unit area and accordingly a decrease in the manufacturing cost of extremely pure oxygen.

Although such membranes of the present invention are overall and economically far superior to pure silver membranes in the commercial production of oxygen because they can be used at higher pressures per unit thickness due to its high temperature and strength characteristics, it is slightly inferior to membranes made of pure silver in the permeation speed of oxygen.

With the above and other objects in view which will become apparent in the following detailed description, the present invention will be clearly understood in connection with the accompanying drawings, in which;

FIG. 3 is a graph showing the yield point at high temperatures of silver and silver-alumina dispersion type metallic oxide alloys of the present invention; and FIG. 4 is a graph showing the amounts of elements added in accordance with the present invention, and the hardness of the dispersion type silver oxide alloy.

Figure 1A:
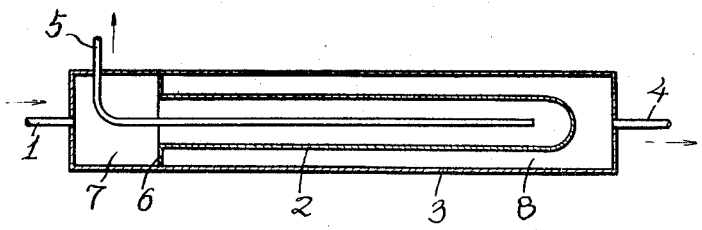
FIGS. 1(A and B) are vertical sectional views of individual separation and purification devices for oxygen properly designed for application with the dispersion type silver alloy membrane of the present invention.

Referring now to the drawings, and more particularly to FIG. 3, curve A shows the high temperature yield point of a silver-alumina dispersion type alloy prepared from a silver-aluminum (0.1% aluminum) alloy through an oxidation process.

Curve B shows experimental results achieved with a silver-aluminum (0.05% aluminum) alloy.

Both curves confirm that the yield point of the dispersion type silver-alumina alloy is far greater than that of pure silver (the lower curve of FIG. 3).

The values of the yield point within the temperature range of 500–900° C. are considerably lower with pure silver than with the dispersion type silver-alumina alloy of the present invention. The reasons that the dispersion type silver-alumina alloy has this superior yield point quality at high temperatures are that the fine grains of alumina are dispersed evenly in the silver composition and that the fine grains of alumina in themselves are composed of a substance with stability which is not subjected to thermal dissociation at high temperature.

For these reasons, it is generally required that the thermal dissociation pressure of an oxide must be sufficiently low even at high temperatures and that the oxide must be such as to maintain stability at high temperatures.

Figure 2:
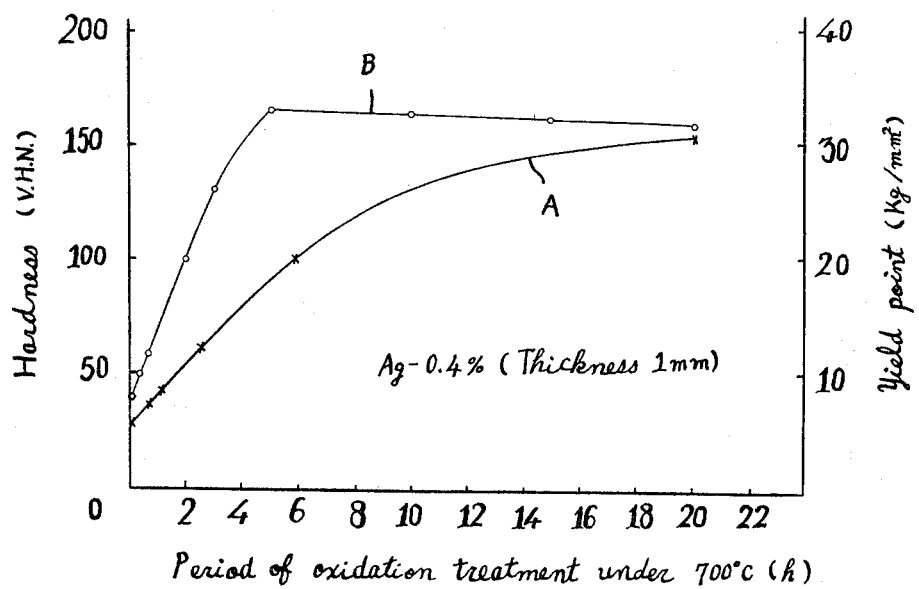
FIG. 2 is a comparative graph showing a period of oxidation treatment and yield point and hardness of a silver-aluminum alloy membrane of the present invention.

Further, in FIG. 2, curve A shows the constant yield point (30 kg./mm.$^2$) of a silver-alumina dispersion type alloy prepared from a silver-aluminum (0.4% aluminum) alloy membrane of 1 mm. in thickness when it is heat treated at 700° C. for 20 hours and curve B shows that the hardness thereof reaches to approximately 170 V.H.N. when said membrane is heat treated at 700° C. for 5 hours. Consequently, it has been found that aluminum is one of the most effective elements for combining with pure silver.

The present invention is characterized by a method of realizing its intended purpose of obtaining marked improvements in the mechanical properties at high temperatures of a silver alloy membrane for separating and refining oxygen comprising a dispersion type silver-metallic oxide alloy having utility as a membrane for the selective permeation of oxygen. The alloy is formed by adding one or more of, not only aluminum, but beryllium, cerium, cadmium, magnesium, manganese, silicon, thorium, titanium and zirconium to silver in the same manner as explained above for aluminum. A silver alloy is thus obtained which is heat treated and the added elements are internally oxidized.

The same dispersing effect as mentioned above with respect to aluminum is observed when beryllium, cerium, cadmium, magnesium, manganese, silicon, thorium, titanium and zirconium are added to silver and so treated. FIG. 4 shows the effects on the hardness of the alloy with various amounts of various elements in accordance with the present invention.

The grain dispersion type silver alloy deteriorates in workability after its oxidation treatment, and therefore, the dispersion type silver-metallic oxide alloy membrane of the present invention must be manufactured by processing of the high temperature oxidation treatment only after molding the dispersion type silver metal alloy into a shape most suited for the membrane for the permeation of oxygen, namely, either, for example, into a thin plate (a film) of a thin tube, the shape depending on its specific application.

By being made of the dispersion type metallic oxide silver alloy as above-mentioned the membrane has a considerably greater yield point and tensile strength than that when made of pure silver. Therefore, it is possible to make the membrane thinner and use it at higher temperatures, which bring the advantages of an increase in the permeation volume of oxygen per unit area and decrease in the manufacturing cost of exceptionally pure oxygen indispensable for production of epitaxial in semiconductor metallurgy.

Measurements were made on the permeation speed of oxygen through the dispersion type silver-alumina alloy membrane with use of the permeation device as shown in FIG. 1.

These measurements revealed that though slightly inferior to membranes made of pure silver in the permeation speed of oxygen, the membrane made of the alloy of the present invention is far superior to pure silver membranes because it can be used at a higher pressure per unit thickness due to its high temperature application characteristics and its high yield point.

Referring now again to the drawings, and more particularly to FIG. 1(A), an apparatus in accordance with the present invention is illustrated comprising an outer cylinder 3 closed at both ends in which is coaxially positioned a long cylindrical silver alloy permeation wall pipe 2 closed at one end and spaced from the walls of the outer cylinder 3. The open end of the pipe 2 is provided with an annular hermetically sealing outwardly extending flange 6 between the pipe 2 and the outer cylinder 3, thereby dividing the interior of the apparatus into an inlet portion 7 and an outlet portion 8 separated by the silver alloy permeation wall pipe 2. An inlet pipe line 1 is provided passing through one end of the outer cylinder and communicating heated oxygen material into the inlet portion 7. The pipe 2 is made of dispersion type silver alloy membrane of the present invention. The pure oxygen is permeated through the silver alloy permeation wall pipe 2 and is collected inside the outer cylinder 3 in the outlet portion 8 and is removed therefrom by an outlet pipe 4 communicating with the outlet portion 8. Impurities which are unable to permeate through the dispersion type silver alloy permeation pipe 2 are continuously removed by an exhaust pipe 5 extending through the outer cylinder 3 into the inlet portion 7 coaxially through the interior of the pipe 2.

Figure 1B:
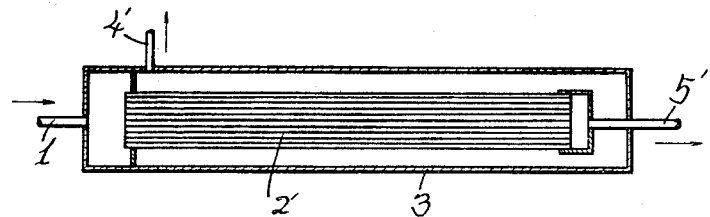

In FIG. 1(B), an apparatus in accordance with the present invention is illustrated comprising an outer cylinder 3 closed at both ends in which is coaxially positioned a plurality of open-ended and elongated inner cylindrical silver alloy permeation wall pipes 2' spaced from the walls of said outer cylinder. One side of open ends of said permeation pipes 2' near an inlet pipe line 1 is sealed hermetically from the outer cylinder 3 and another side of said permeation pipes 2' is communicated collectively with an exhaust pipe 5', by those to divide the interior of the outer cylinder 3 into an inlet portion at the interior of said permeation pipes and an outlet portion at the exterior of said permeation pipes. Said inlet pipe line 1 is provided passing through one end of the outer cylinder 3 and communicating heated oxygen materials into the inlet portion. The pipes 2' are made of dispersion type silver alloy membrane of the present invention. An outlet pipe 4' is provided passing through a wall of the outlet cylinder to remove permeated oxygen from the outlet portion. Said exhaust pipe 5' is provided passing through another end of the outer cylinder 3 to remove impurities unable to permeate through the permeation pipes 2' from the inlet portion.

Table 2 below shows values recorded by measurements with the equipment shown in FIG. 1 of the permeation speed of oxygen with air being used as the oxygen material. The values shown in Table 2 are those obtained with use of a dispersion type alloy permeation pipe made of an alloy of silver and alumina (0.1% aluminum); similar values were recorded when pipes were made of alloys with the other mentioned elements.

TABLE 2

| Temperature (° C.): | Rate of oxygen permeability (D: cc./cm.$^2$, sec., mm. t., atm. air) |
|---|---|
| 400 | $1.36 \times 10^{-9}$ |
| 500 | $8.26 \times 10^{-9}$ |
| 600 | $3.60 \times 10^{-8}$ |
| 700 | $1.07 \times 10^{-7}$ |
| 800 | $1.41 \times 10^{-7}$ |
| 900 | $5.84 \times 10^{-7}$ |

EXAMPLE 1

In the equipment shown in FIG. 1(A) with 10 mm. diameter of the oxygen permeation pipe 2 and made of a 0.06 mm. thick dispersion type alloy membrane (silver= 0.1% aluminum), excessively pure oxygen of 3 l./m.$^2$ per hour was obtained when industrial impure oxygen in a bomb was compressed into the system at 900° C. at a pressure of 10 kg./cm.$^2$.

The product oxygen was so high in purity that no impurity was detected when inspected by mass-spectrography and gas chromatograph. The permeation volume of the oxygen obtained was calculated from the value shown in Table 2.

EXAMPLE 2

In the equipment shown in FIG. 1(B), thin pipes of 2 mm. in diameter x 0.06 mm. in thickness x 1,000 mm. in length were made of an alloy of silver and 0.05% aluminum and heat treated at 700° C. for 30 minutes, 162 pieces of the thin pipes being bundled into one.

Impure oxygen (more than 99.3%) in a bomb was compressed into the thin pipes at a temperature of 900° C. under a pressure of 30 kg./cm.$^2$, and excessively pure oxygen of 54 l./m.$^2$ per hour was obtained.

While we have disclosed several embodiments of the present invention, it is to be understood that these embodiments are given by example only and not in a limiting sense, the scope of the present invention being determined by the objects and the claims.

We claim:
1. A process for selectively permeating oxygen from a gaseous mixture containing oxygen through an oxide disperson type silver membrane,
    said oxide dispersion type silver membrane comprising a metal oxide of at least one metal selected from the group consisting of aluminum, beryllium, cerium, cadmium, magnesium, manganese, silicon, thorium, titanium and zirconium, and silver,
    the amount of said metal oxide being 0.01–2.0% aluminium, 0.005–2.0% beryllium, 0.01–10.0% cerium, 0.1–10.0% cadmium, 0.005–2.0% magnesium, 0.01–3.0% manganese, 0.01–2.0% silicon, 0.005–2.0% thorium, 0.01–2.0% titanium and 0.005–2.0% zirconium, each calculated as metal, and the amount of silver being substantially the rest,
    said oxide dispersion type silver membrane being formed by internal oxidation of an alloy membrane comprising a metal of said metal oxide and silver, and comprising the steps of
        dispersing said gaseous mixture containing oxygen through said oxide dispersion type silver membrane, and
        recovering oxygen diffused through said membrane.
2. An apparatus for selectively permeating oxygen from a gaseous mixture containing oxygen, comprising
    an outer cylinder closed at both ends,
    an elongated inner cylindrical permeation pipe closed at one end and coaxially disposed within said outer cylinder spaced from the walls of said outer cylinder,
    an annular wall extending about the open end of said permeation pipe and hermetically sealing the pipe from said outer cylinder, thereby dividing the interior of the outer cylinder into an inlet portion at the interior of said permeation pipe and an outlet portion at the exterior of said permeation pipe,
    an inlet line means for passing said gaseous mixture into said inlet portion,
    an outlet line means for removing permeated oxygen from said outlet portion,
    an exhaust pipe means communicating with said inlet portion for removing impurities unable to permeate through said permeation pipe, and
    said permeation pipe comprising a metal oxide of at least one metal selected from the group consisting of aluminum, beryllium, cerium, cadmium, magnesium, manganese, silicon, thorium, titanium and zirconium, and silver, the amount of said metal oxide being 0.01–2.0% aluminum, 0.005–2.0% beryllium, 0.01–10.0% cerium, 0.1–10.0% cadmium, 0.005–2.0% magnesium, 0.01–3.0% manganese, 0.01–2.0% silicon, 0.005–2.0% thorium, 0.01–2.0% titanium and 0.005–2.0% zirconium, each calculated as metal, and the amount of silver being substantially the rest, and said permeation pipe being formed by internal oxidation of a pipe of an alloy comprising a metal of said metal oxide and silver.

3. The apparatus, as set forth in claim 2, wherein said exhaust pipe means extends coaxially into the inside of said permeation pipe therealong.

4. An apparatus for selectively permeating oxygen from a gaseous mixture containing oxygen, comprising an outer cylinder closed at both ends, an inlet line means for passing a gaseous mixture containing oxygen into said apparatus, an outlet line means for removing permeated oxygen from said apparatus, an exhaust pipe means for removing non-permeated gases from said apparatus, a plurality of open-ended and elongated inner cylindrical permeation pipes disposed coaxially within said outer cylinder and spaced from the walls of said outer cylinder, one side of the open ends of said permeation pipes operatively communicating collectively with said inlet line means and being sealed hermetically from said outer cylinder and the other side of the open ends of said permeation pipes communicating collectively with said exhaust pipe means, dividing the interior of said outer cylinder into an inlet portion at the interior of said permeation pipes and an outlet portion at the exterior of said permeation pipes, said inlet line means for passing said gaseous mixture into said inlet portion, said outlet line means for removing permeated oxygen from said outlet portion, said exhaust pipe means communicating with said inlet portion for removing impurities unable to permeate through said permeation pipes, and said permeation pipes comprising a metal oxide of at least one metal selected from the group consisting of aluminum, beryllium, cerium, cadmium, magnesium, manganese, silicon, thorium, titanium and zirconium, and silver, the amount of said metal oxide being 0.01–2.0% aluminum, 0.005–2.0% beryllium, 0.01–10.0% cerium, 0.1–10.0% cadmium, 0.005–2.0% magnesium, 0.01–3.0% manganese, 0.01–2.0% silicon, 0.005–2.0% thorium, 0.01–2.0% titanium and 0.005–2.0% zirconium, each calculated as metal and the amount of silver being substantially the rest, and said permeation pipes being formed by internal oxidation of pipes of an alloy comprising metal of said metal oxide and silver.

References Cited

UNITED STATES PATENTS

| 2,255,069 | 9/1941 | Maier | 55—16 |
| 3,172,742 | 3/1965 | Rubin. | |
| 3,245,206 | 4/1966 | Bonnet | 55—158 |
| 3,251,173 | 5/1966 | Ehlers et al. | 55—158 |

FOREIGN PATENTS

| 611,813 | 11/1948 | Great Britain. |

REUBEN FRIEDMAN, Primary Examiner

C. N. HART, Assistant Examiner

U.S. Cl. X.R.

55—158